United States Patent
Schreiber

(10) Patent No.: US 6,750,633 B2
(45) Date of Patent: Jun. 15, 2004

(54) ELECTRICAL CIRCUIT FOR GENERATING A THREE-PHASE ALTERNATING CURRENT

(75) Inventor: Dejan Schreiber, Zirndorf (DE)

(73) Assignee: Semikron Elektronik GmbH, Nuremberg (DE)

( * ) Notice: Subject to any disclaimer, the term of this patent is extended or adjusted under 35 U.S.C. 154(b) by 0 days.

(21) Appl. No.: 10/299,049

(22) Filed: Nov. 18, 2002

(65) Prior Publication Data

US 2003/0155893 A1 Aug. 21, 2003

(30) Foreign Application Priority Data

Nov. 17, 2001 (DE) .......................... 101 56 694

(51) Int. Cl.[7] .................. H02P 15/00; H02P 3/00; H02P 9/06; H02P 9/04; F01D 15/10
(52) U.S. Cl. ................ 322/12; 322/10; 290/52; 290/40 B; 318/801; 318/811
(58) Field of Search ......... 322/12, 10; 290/40 A–40 D; 318/138, 801, 811

(56) References Cited

U.S. PATENT DOCUMENTS

| | | | | |
|---|---|---|---|---|
| 3,663,948 A | * | 5/1972 | Nagae et al. ................ 323/204 |
| 4,349,744 A | * | 9/1982 | Reuther et al. ........... 290/40 C |
| 4,357,545 A | * | 11/1982 | Le Grand et al. ............. 307/64 |
| 4,450,363 A | * | 5/1984 | Russell et al. ............. 290/40 C |
| 4,590,416 A | * | 5/1986 | Porche et al. ................ 323/205 |
| 4,680,691 A | * | 7/1987 | Yoshino et al. ............... 363/51 |
| 4,684,875 A | * | 8/1987 | Powell ........................ 323/204 |
| 4,739,423 A | * | 4/1988 | Ida ............................... 360/93 |
| 5,053,635 A | * | 10/1991 | West ............................ 307/67 |
| 5,635,773 A | * | 6/1997 | Stuart .......................... 307/66 |
| 5,986,907 A | * | 11/1999 | Limpaecher ................. 363/61 |
| 5,998,976 A | * | 12/1999 | Steffan ........................ 322/10 |
| 6,020,713 A | | 2/2000 | Geis et al. ................... 318/801 |
| 6,093,975 A | | 7/2000 | Peticolas ..................... 290/52 |
| 6,130,524 A | * | 10/2000 | Stemmler .................... 323/207 |
| 6,445,079 B1 | * | 9/2002 | Gale et al. .................... 290/31 |
| 6,657,322 B2 | * | 12/2003 | Skibinski et al. ........... 307/105 |
| 6,657,416 B2 | * | 12/2003 | Kern et al. ................... 322/29 |
| 6,661,110 B2 | * | 12/2003 | Suzuki et al. ............. 290/40 C |

* cited by examiner

*Primary Examiner*—Burton S. Mullins
*Assistant Examiner*—Pedro J. Cuevas
(74) *Attorney, Agent, or Firm*—Darby & Darby

(57) ABSTRACT

An electrical circuit for producing a three-phase AC current from a low-power generator (10 kW to 5 MW) and for feeding the current into a power grid has a forward mode where energy flows from the generator to the power grid or to an energy-storage device and a reverse mode where energy flows from the power grid or from the energy-storage device back to the generator. To support the forward mode, the circuit has a generator-adjacent circuit stage with diode rectifiers and booster circuits, an intermediate circuit stage with two capacitor groups arranged in series, and a grid-adjacent circuit stage with an inverter. To support the reverse mode, the circuit has diode rectifiers and booster circuits in the grid-adjacent circuit stage, the two capacitor groups of the intermediate circuit stage, and an inverter in the generator-adjacent circuit stage.

8 Claims, 5 Drawing Sheets

Fig. 1 STATE OF THE ART

Fig. 2 STATE OF THE ART

Fig. 3 STATE OF THE ART

Fig. 4 STATE OF THE ART

ELECTRICAL CIRCUIT FOR GENERATING A THREE-PHASE ALTERNATING CURRENT

BACKGROUND OF THE INVENTION

The invention relates to an electrical circuit for generating a three-phase alternating current by means of a generator of low power output (10 kW to 5 MW), so that the current can be fed into a power grid. Generators with a small power output are particularly suitable as decentralized power supply units, also with co-generation of heat and power, as emergency power generators, as decentralized power plants for filling demand peaks in the power grid, or to supply power in certain areas that do not have a access to the grid of a public power utility.

Generators of low and intermediate power capacity of the kind described above are driven, for example, by gas turbines, fuel-cell/gas-turbine combinations, fermentation-gas engines, or diesel engines. These power generators have the advantage that they are able to meet variable power requirements. They can be regulated in response to the actual demand for electricity by controlling the amount of mechanical power produced by the drive sources of the generators. Thus, only as much energy is consumed as is needed to generate the required volume of electricity.

Wind-power plants, likewise, represent electricity producers with variable power delivery. Here, the parameters that determine the power input to the generator are represented by controllable quantities such as, e.g., the pitch angle of the rotor blades as well as non-controllable quantities such as wind velocity.

However, the aforementioned generators have the disadvantage that, as a rule, the power produced by them does not conform to the voltage and frequency requirements of the power grid to which the output terminals of the generators are connected. In particular, this is a problem with a demand-dependent regulation of the generator. Most of the aforementioned drive sources for low-power generators run at higher speeds and thus produce frequencies in the kilohertz range in a generator without a speed-reducing gearbox. The power grid, on the other hand, requires a frequency of 50 Hz or 60 Hz. A regulation that dynamically adapts to different requirements is particularly economical but causes a variable voltage of the output current in synchronous generators with permanent excitation. In synchronous generators with external excitation, the voltage can be adjusted by way of the excitation current of the generator, but this reduces the efficiency of the generator. A number of different arrangements of power-electronics circuits are known which work as inverters to perform the task of adapting the electrical quantities.

It may further be necessary to start the generator by using energy from the power grid or, if no power grid is available, from an external energy-storage device. In the latter case, it is practical to recharge the energy-storage device after the generator has been started.

A circuit for generators with permanent excitation or external excitation is known from U.S. Pat. No. 6,020,713, where the generator output voltage is converted to the intermediate-circuit DC voltage by means of two diode rectifiers. From the intermediate-circuit DC voltage, an output inverter generates an output voltage, which is then converted by a transformer into the voltage required by the power grid. This arrangement allows the generation of three-phase output voltages of 380V, 400V, 440V, 480V or 500V at frequencies of 50 Hz or 60 Hz. A three-phase power grid also requires a neutral connection. The arrangement just described has the disadvantage that it requires a transformer at the output side that is designed for the maximum possible output power level, which increases the cost of the power plant and takes up additional space.

The foregoing circuit arrangement according to U.S. Pat. No. 6,020,713 can also be used without the transformer at the output side, however in this case the maximum output voltage is limited to the level of the generator voltage. It is a disadvantage of this arrangement as well as of the previously described circuit that the start-up process of the power plant cannot be accomplished by simple means.

A further circuit arrangement proposed in U.S. Pat. No. 6,020,713 includes a fourth half-bridge for the active regulation of the neutral output connection, sharing the same drawbacks that were mentioned above.

Further proposed in U.S. Pat. No. 6,020,713 as well as in U.S. Pat. No. 6,093,975 are circuit arrangements that allow the generator to be used as starter motor for the gas turbine that drives the generator in its regular operating mode as a power plant. This is accomplished by adding a rectifier that is connected to the grid by means of a group of switches. At the same time the output of the inverter is connected to the generator through a group of switches and disconnected from the power grid by means of a further group of switches. The added rectifier feeds the intermediate circuit stage from the power grid. The inverter following the intermediate circuit stage powers the generator, which in this case works as a motor to start the gas turbine. In U.S. Pat. No. 6,093,975, a further circuit arrangement is proposed to supply the energy for the start-up of the gas turbine from an energy storage device such as a battery. This is accomplished through an external booster circuit to obtain a higher voltage from the battery to feed the intermediate circuit stage from which the generator (working as a motor) is powered to start the gas turbine.

Design solutions using an external transformer with either of the circuit arrangements just described have the known inherent drawbacks. A solution without the transformer, on the other hand, has the disadvantage that the maximum output voltage is tied directly to the generator voltage. As a further disadvantage, three groups of mechanical switches are required to switch the power plant to the start-up mode. To enable a battery-powered start-up, an additional circuit has to be provided.

OBJECT OF THE INVENTION

The present invention therefore has the objective to provide a circuit for connecting a generator that is driven at a variable rpm-rate by a machine or wind turbine to a three-phase, 50 Hz- or 60 Hz power grid. Specifically, the objective calls for a circuit that can be realized with the smallest possible number of components and enables the generator to feed the power grid with a high degree of efficiency, independent of the generator rpm-rate or the generator voltage. The objective for the circuit according to the invention further specifies that the circuit must be able to tolerate an asymmetric load in the power grid, that it can be coupled directly to the power grid without an interposed transformer, and that it provides the capability to use the generator as a starter motor for the engine that normally drives the generator, with the energy for the start-up mode being supplied either by the power grid or by an external energy-storage device.

SUMMARY OF THE INVENTION

To meet the foregoing objective, the invention proposes a circuit for connecting a three-phase generator that is driven at a variable speed to a three-phase power grid. To support a forward operating mode where the energy flows from the generator to the power grid or to an energy-storage device, the circuit has a diode rectifier in combination with booster circuits on the side of the circuit that is nearest to the generator (which will also be referred to as the generator-adjacent circuit stage), an intermediate circuit stage formed by a series arrangement of two capacitor groups, and an inverter on the side of the circuit that is nearest to the power grid (which will also be referred to as the grid-adjacent circuit stage). To support a reverse operating mode where the energy flows from the energy-storage device or from the power grid to the generator, the circuit has a diode rectifier in combination with booster circuits in the grid-adjacent circuit stage, the aforementioned series arrangement of the two capacitor groups in the intermediate circuit stage, and an inverter in the generator-adjacent circuit stage. The entire arrangement of diode rectifiers, booster circuits and inverters together is formed by three generator-adjacent inductive elements, three grid-adjacent inductive elements, six generator-adjacent transistors and six generator-adjacent rectifier diodes, six grid-adjacent transistors and six grid-adjacent rectifier diodes. The neutral conductor of the power-grid is connected to the central junction of the three phase-associated windings of the generator and to the midpoint between the two capacitor groups.

In short, the circuit according to the invention consists of a symmetric arrangement of two three-phase inverters, an intermediate circuit stage of two capacitor groups arranged in series, inductance coils arranged after the generator, and a neutral conductor that is connected on the one hand to the center point of the star-like arrangement of the generator windings associated with the three phases and on the other hand to the midpoint of the serial arrangement of the two capacitor groups.

In the normal operation (also referred to as forward mode) of the circuit arrangement, where the flow of energy is directed from the generator to the power grid—and if the generator voltage after rectification to produce the intermediate circuit voltage is sufficient to feed the power grid directly through a subsequent inverter—the diodes of the inverter on the generator side function as an input rectifier that converts the AC voltage of the generator into the DC voltage of the intermediate circuit stage. The inverter that is arranged on the grid side of the circuit converts the intermediate-circuit voltage into the desired grid voltage with the appropriate frequency and feeds it through inductance coils, i.e., without a transformer, directly into the power grid.

Further in the normal operating mode of the circuit, if the generator voltage in the sense of the foregoing definition is too low, e.g., because of a low demand for energy and a corresponding low rpm-rate of the generator, the inverter and the inductance coils on the generator side work together as a booster circuit. Thus the intermediate circuit stage can be charged to the required DC voltage level, which the inverter on the grid-adjacent side converts into the desired grid voltage with the appropriate grid frequency, to feed it again (as in the preceding case) directly through inductance coils into the power grid.

In the starter mode, where the flow of energy is directed into the generator and where the generator works as a motor to start the actual drive source (e.g., a gas turbine), one has to differentiate again between two possibilities.

If the power for the start-up operation is supplied from the power grid, the diodes of the inverter in the grid-adjacent circuit stage work as an input diode bridge to generate an intermediate circuit voltage from the grid voltage. The intermediate circuit voltage is converted by the inverter in the generator-adjacent circuit stage into an AC voltage to drive the generator which in this case operates as a motor.

If there is no power-grid voltage available, an energy-storage device is connected to the circuit in an arrangement where the inverter on the grid side of the circuit is disconnected from the power grid by means of a group of switches and where two of the three output terminals of the inverter are connected to the energy-storage device by means of a further group of switches. To start the power plant with energy from a storage device, the inverter on the grid side of the circuit is disconnected from the grid and connected instead to the energy-storage device. Since typical energy-storage devices have a lower voltage than is necessary to operate the generator as a motor, the inverter and the inductance coils on the grid side of the circuit work together as a booster circuit and thus generate the required voltage level in the intermediate circuit stage, so that the generator can be operated as a motor by means of the inverter on the generator-adjacent side of the circuit.

BRIEF DESCRIPTION OF THE DRAWINGS

A preferred embodiment of the inventive concept will be discussed below on the basis of the attached drawings, wherein.

DETAILED DESCRIPTION OF THE INVENTION

Figure 1:
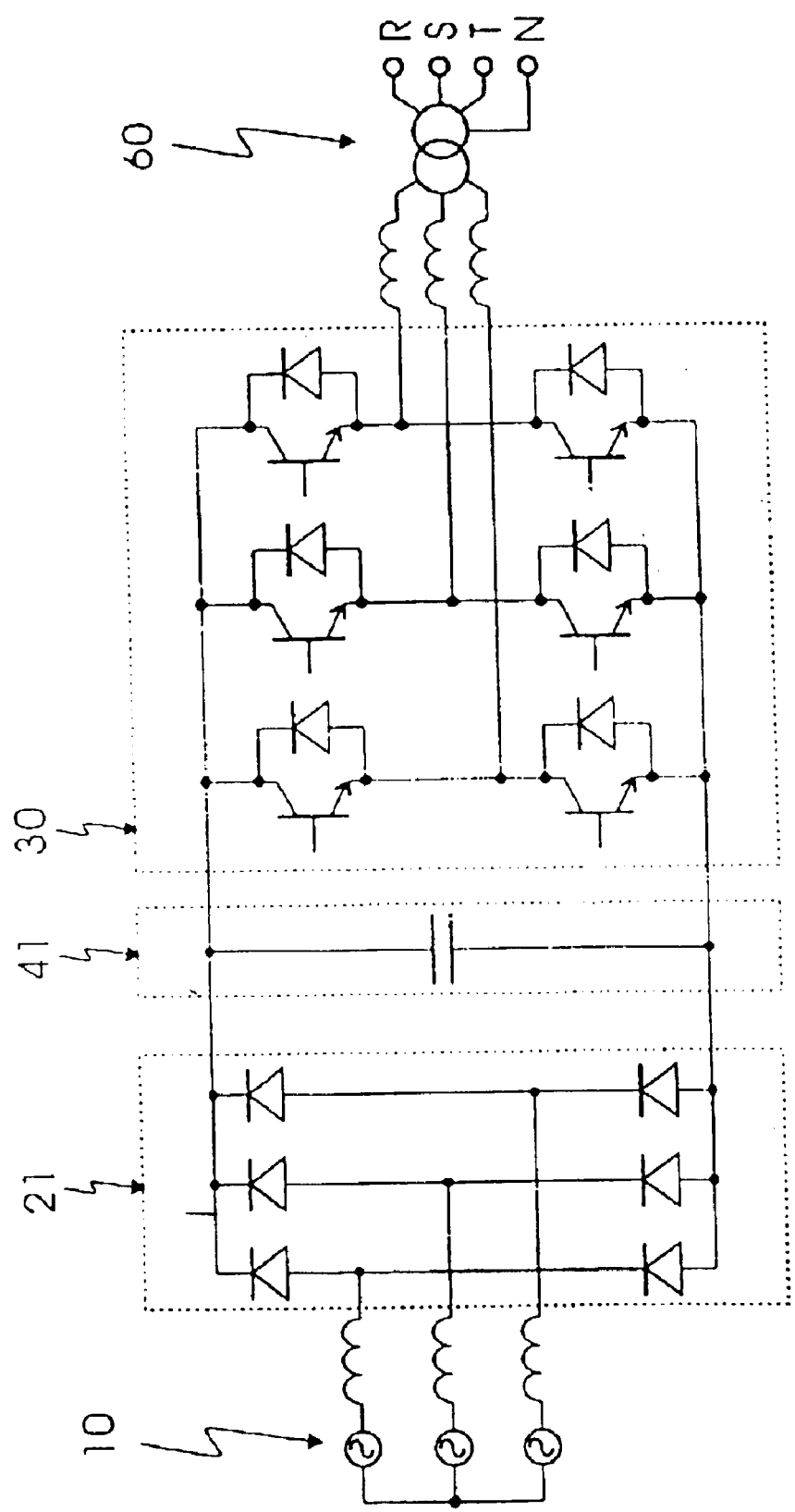
FIG. 1 illustrates a circuit according to the state of the art without a neutral conductor, for the energy-flow direction from a generator into a power grid, involving the use of a transformer.

FIG. 1 illustrates a circuit according to the state of the art without a neutral conductor, for the energy-flow direction from a generator into a power grid, working with a transformer. The three phases of the generator 10 are rectified by means of a bridge rectifier 21 and held in transient storage in a capacitor in the intermediate circuit stage 41. An inverter 30 converts the DC voltage into a sinusoidal AC voltage. A transformer 60 is required to adapt the voltage to the power grid. This circuit configuration has the drawback that variable rpm-rates, which translate into variations of the generator output voltage, can be compensated only to a very unsatisfactory extent. Circuit configurations of this kind are very well suited for generators that are driven at a constant rpm-rate.

Figure 2:
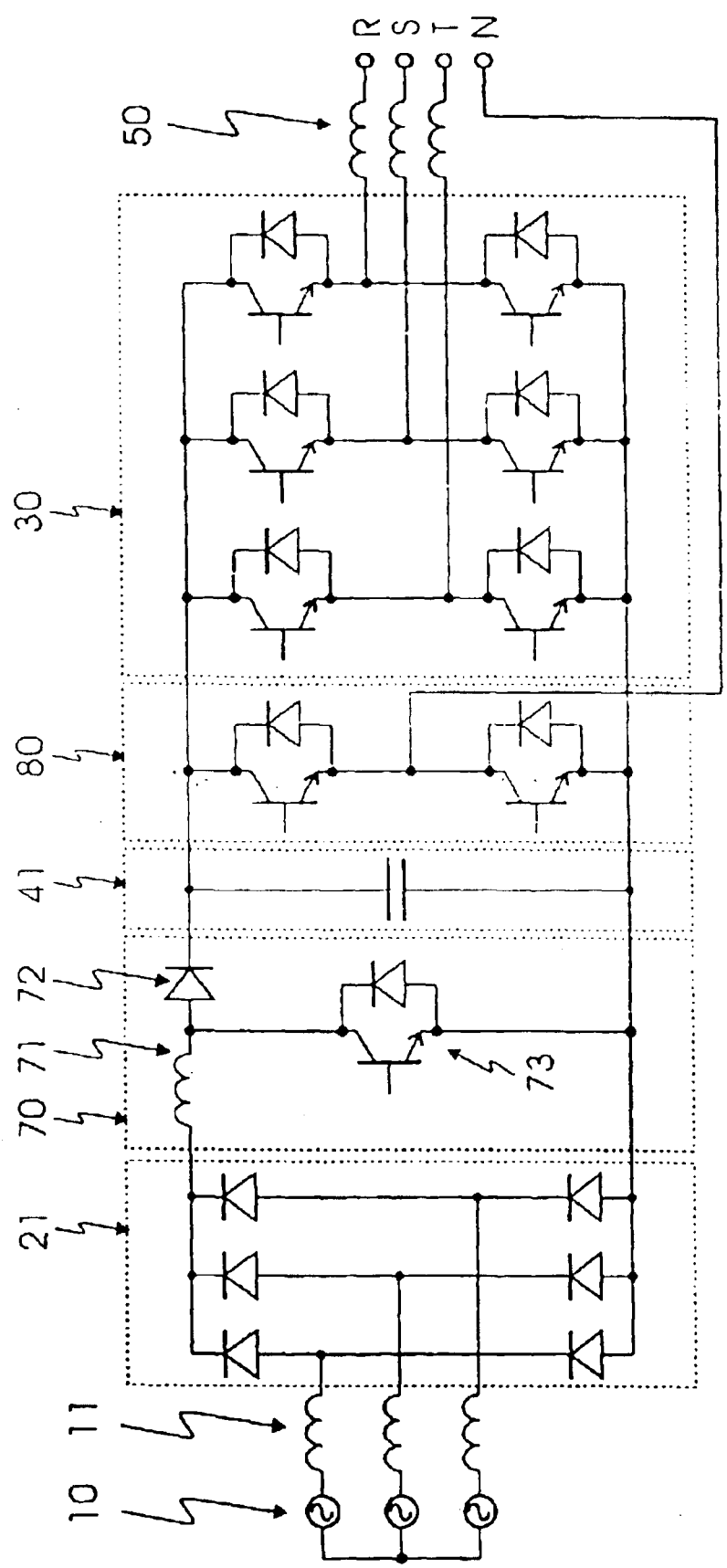
FIG. 2 illustrates a circuit according to the state of the art with an actively generated neutral level, for the energy-flow direction from a generator into a power grid, involving the use of a booster circuit.

FIG. 2 illustrates a circuit arrangement according to the state of the art with an actively generated neutral level, for the energy-flow direction from a generator into a power grid, in which a booster circuit is used. In contrast to the circuit of FIG. 1, the output voltage in this case is not adapted through a transformer. Instead, the voltage is raised to the required level of the intermediate circuit stage already after the bridge rectifier 21 through a booster circuit 70 consisting of a coil 71, a diode 72, as well as a switch 73, in this case an IGBT (Insulated Gate Bipolar Transistor) running anti-parallel with a diode. The voltage in the intermediate circuit stage 41 depends on the desired output voltage (grid voltage) of the inverter 30. Each of the outputs of the inverter 30 is connected to the power grid by way of an inductance coil 50. A neutral conductor N of the grid is actively generated by a further half-bridge circuit 80.

Figure 3:
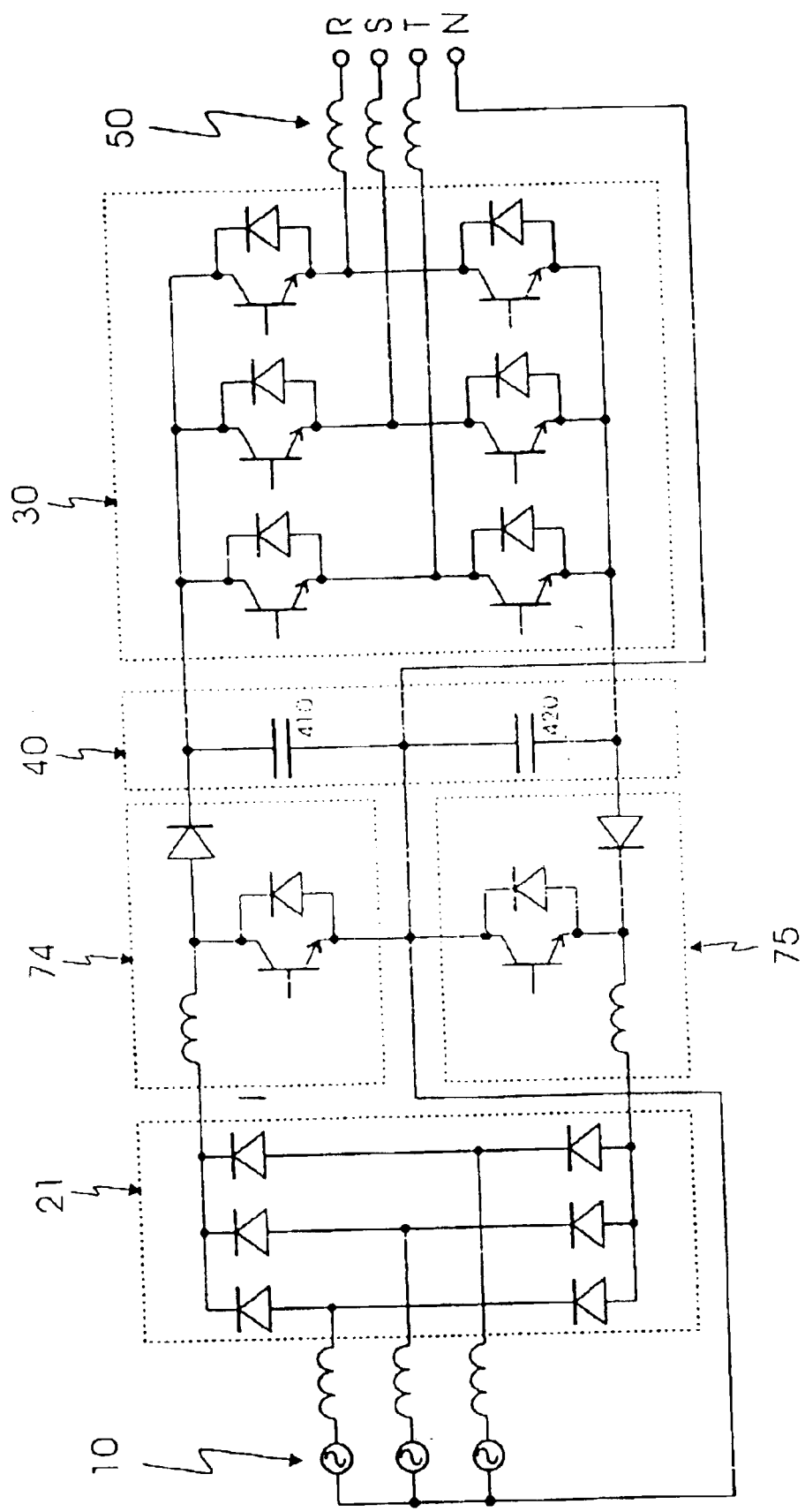
FIG. 3 illustrates a circuit according to the state of the art with an actively regulated neutral level, for the energy-flow direction from a generator into a power grid, involving the use of two booster circuits.

FIG. 3 illustrates a circuit according to the state of the art with an actively regulated neutral level, for the energy-flow direction from a generator into a power grid, using two booster circuits. The boost function that was already described in the context of FIG. 2 is in this case performed by means of two booster circuits 74, 75. The intermediate circuit voltage generated by the booster circuits is stored in the two capacitors 410, 420 lying in series in the intermediate circuit stage 40. The flexible boosting with the two circuits 74 and 75 makes it possible to omit the additional half bridge 80 for the active regulation of the neutral potential. In this case, the neutral conductor of the power grid is connected to the midpoint of the capacitor series 410, 420 of the intermediate circuit as well as to the generator 10.

Figure 4:
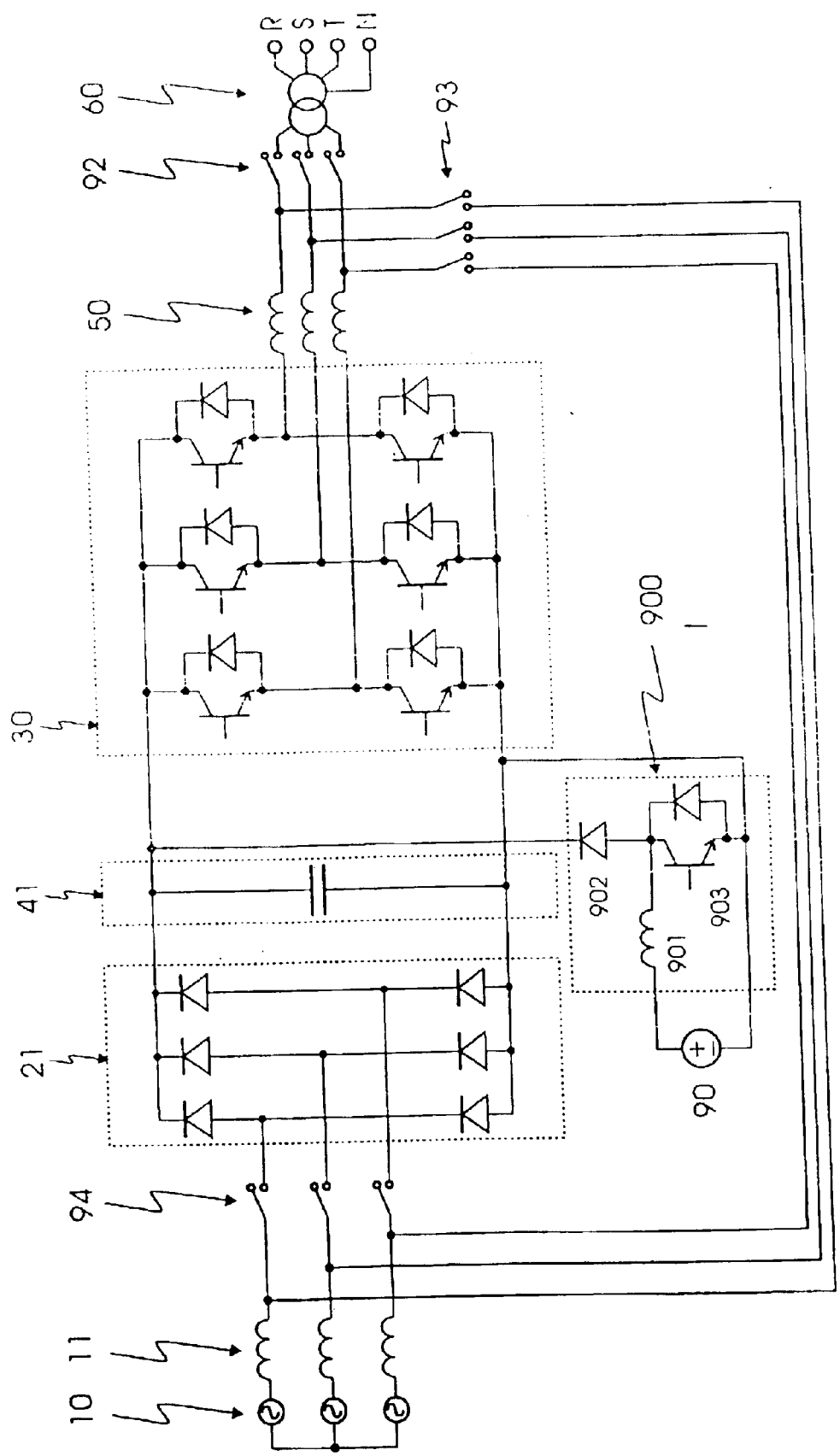
FIG. 4 illustrates a circuit analogous to the arrangement of FIG. 1, but offering the possibility to operate the generator as a motor drawing power from an energy-storage device.

FIG. 4 illustrates a circuit that is analogous to the arrangement of FIG. 1 but offers the possibility to operate the generator 10 as a motor drawing power from an energy-storage device 90. This is accomplished by tying a booster circuit 900 consisting of a coil 901, a diode 902 and a switch 903 to the intermediate circuit stage 41. During the start-up phase, the output of the inverter is disconnected from the power grid by means of the switches 92. It is further necessary to connect the output of the inverter 30 to the generator 10, which in this case works as a motor, by means of the switches 93, and to disconnect the generator 10 from the input of the bridge rectifier 21 by means of the switches 94.

Figure 5:
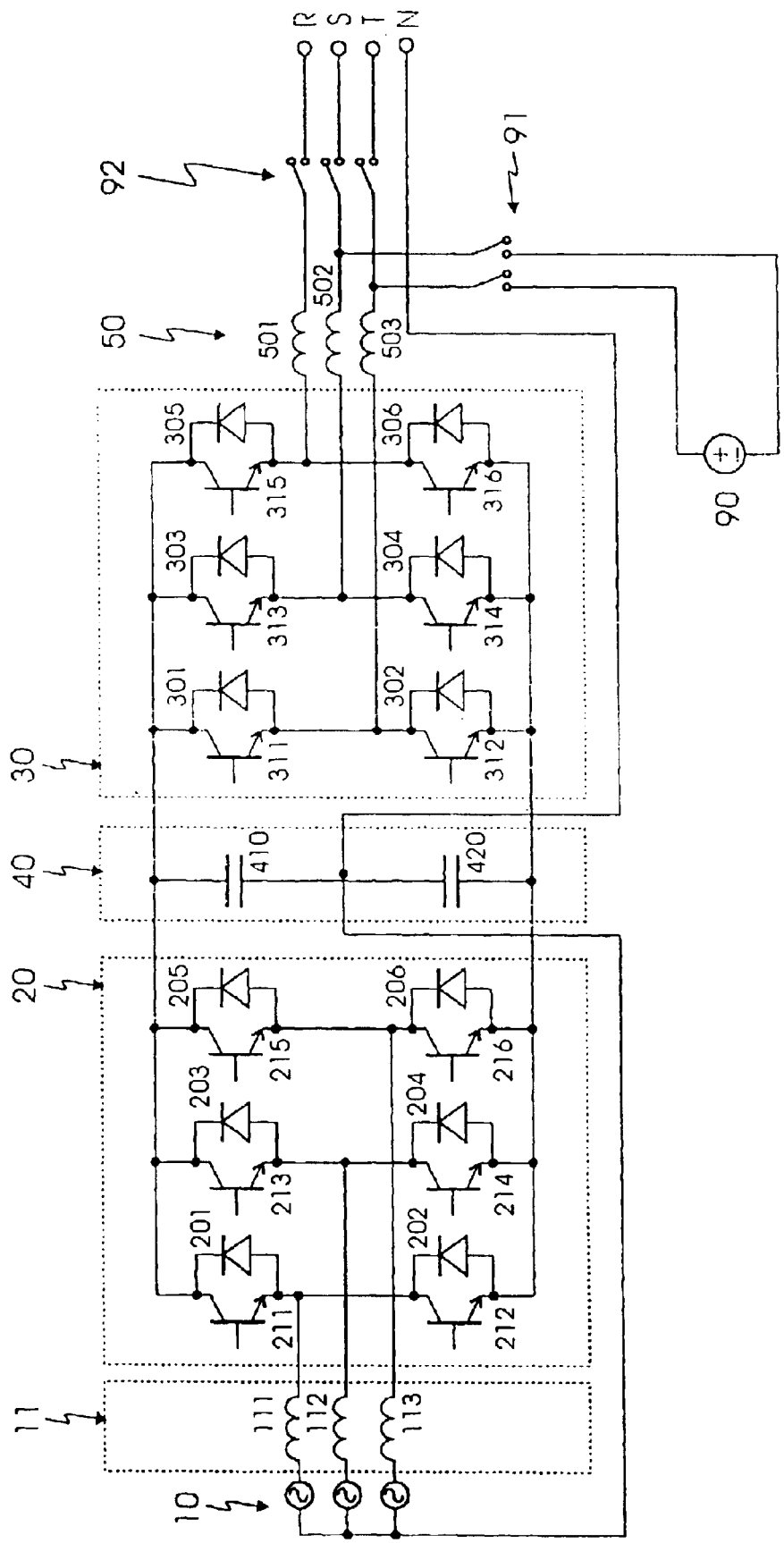
FIG. 5 illustrates a circuit according to the invention, which offers all of the functional modes of the circuits shown in FIGS. 2 to 4.

FIG. 5 illustrates a circuit according to the invention. The generator that is used in this case is a permanently excited three-phase generator producing a variable voltage with a variable frequency depending on the rpm-rate of the generator. The advantage of generators with a permanent excitation lies in their uncomplicated design and in their very high efficiency in all operating states, i.e., at different rpm-rates. The dependency of the output voltage on the rpm-rate is described by the equation $$U_{gen}i = k \cdot \Phi \cdot n$$

wherein n=rpm-rate k=constant $\Phi$=magnetic flux in the generator i=integer index from 1 to 3

The generator windings are connected in a star-like circuit arrangement, and a neutral conductor N is also brought to the outside.

The voltages $U_{gen}1$, $U_{gen}2$ and $U_{gen}3$ are connected by way of three inductive elements 111 to 113 to the inverter 20 on the generator-adjacent side of the circuit. The inductive elements 111 to 113 can be represented by the internal inductances of the generator 10. If the internal inductances prove to be too small for a given generator, they are supplemented by additional external inductance coils. The inverter 20 consists of the three-phase bridge arrangement with IGBTs 211 to 216 as power switches, where each of the IGBTs has a diode 201 to 206 running anti-parallel to it. The intermediate circuit stage is formed of the two capacitors 410, 420 arranged in series, or by appropriately configured groups of capacitors. The midpoint of the capacitor series is connected to the neutral conductor N.

Arranged next in sequence after the intermediate circuit stage is the inverter 30 on the grid-adjacent side of the circuit. The inverter 30 on the grid-adjacent side is topologically identical to the inverter on the generator-adjacent side. Accordingly, the inverter 30 on the grid-adjacent side is likewise composed of IGBTs 311 to 316 with diodes 301 to 306, respectively, running anti-parallel to the IGBTs. The inverter 30 has three outputs for the phases R, S, T, each of which is followed by an inductance coil 50.

To allow the power plant to be started without supplying power from the power grid, an energy-storage device 90 can be connected to the circuit. Two groups of switches are provided, so that either the output terminals R, S, T of the inverter 30 on the grid-adjacent side are connected through the switch group 92 to the power grid, or the output terminals S, T of the inverter 30 on the grid-adjacent side are connected through the switch group 91 to the energy-storage device. The arrangement allows one or the other but not both of the switch groups 91, 92 to be closed at any given time, in order to prevent a destruction of the energy-storage device.

The circuit can work in the following operating modes, which will be described below:

1. Start-up mode, drawing power from the power grid.
2. Start-up mode, drawing power from the energy-storage device.
3. Power-generating mode with a generator output voltage of approximately 1.4 times the magnitude of the grid voltage.
4. Power-generating mode with a generator output voltage of less than approximately 1.4 times the magnitude of the grid voltage.

In the first mode, starting the power plant with power supplied from the power grid, the switches of the group 92 are closed. The three phases of the line current from the power grid charge the capacitors 410, 420 of the intermediate circuit through the diodes 301 to 306 of the inverter 30 on the grid side of the circuit. The voltage in the intermediate circuit is held at the desired value by a suitable process of turning the power switches 311 to 316 on and off. The inverter 20 on the generator side is controlled in such a manner that the generator 10 works as a motor. The motor now turns the actual drive source of the power plant, e.g., a fermentation gas engine or a gas turbine. After the drive source has been started, the circuit operates in one of the power-generating modes, i.e., mode 3 or mode 4 in the foregoing enumeration.

In the second mode, starting the power plant with power supplied by the energy-storage device, e.g., a storage battery, the switches of the group 92 are open, while the switches of the group 91 are closed. This allows current to flow from the energy-storage device to the inverter on the grid side of the circuit. The power switches 312, 314 are operated in a pulse mode according to the following equation:

$$U_{int} = U_{batt} \cdot T_{on}/(T - T_{on}),$$

wherein T=period of the switching cycle $T_{on}$=ON-period of the switch $U_{int}$=voltage of the intermediate circuit $U_{batt}$=voltage of the energy-storage device During the time $T_{on}$, the energy-storage device is short-circuited through the inductance coil 503, the power switch 312, the diode 304, and the inductance coil 502. In this phase, the current flowing from the battery shows an increase that depends on the inductance of the coils 502 and 503. After the power switch 312 is turned off, current continues to flow into the intermediate circuit through the diodes 301, 304. The inverter 30 on the grid side is used in this case as a booster circuit to charge the intermediate circuit 40. As in the first operating mode, the inverter 20 is again controlled in such a manner that the generator 10 works as a motor. The motor turns the actual drive source of the power plant. After the drive source has been started, the switches of the group 91 are opened and the switches of the group 92 are closed, so that the circuit works in a power-generating mode.

In the third operating mode, power is produced with a generator output voltage of approximately 1.4 times the magnitude of the grid voltage. In this case, the generator output voltage is large enough so that after rectification through the diodes 201 to 206 of the generator-adjacent inverter 20, the intermediate circuit 40 is charged to the voltage level required for the grid-adjacent inverter 30 to produce a three-phase AC voltage of sufficient magnitude to feed current into the power grid.

In the fourth operating mode, power is produced with a generator output voltage that is less than approximately 1.4 times the magnitude of the grid voltage. In this case, the voltage supplied by the generator 10 needs to be raised in order to obtain the required voltage in the intermediate circuit. This is accomplished by using for each of the three generator voltages an inductance coil in combination with a half-bridge of the generator-adjacent inverter. The inductance coil 111, the power switches 211, 212, as well as the diodes 201, 202 are used for the voltage $U_{gen1}$. Analogously, the inductance coil 112, the power switches 213, 214, and the diodes 203, 204 are used for the voltage $U_{gen2}$, while the inductance coil 113, the power switches 215, 216, and the diodes 205, 206 are used for the voltage $U_{gen3}$.

Following is a detailed description of the fourth operating mode, using $U_{gen1}$ as an example. If the voltage across the capacitor 410 is smaller than one-half of the required voltage for the intermediate circuit, the power switch 212 is turned on during the positive half-period of $U_{gen1}$. This creates a short circuit of $U_{gen1}$ through the inductance coil 111, the power switch 212, and the capacitor 420. After the power switch 212 has been turned off, the capacitor 410 is charged through the diode 201 by the voltage $U_{gen1}$ with the energy stored in the inductance coil 111. This charging process makes use of the fact that energy is stored in the inductance coil 111. Analogously, during the negative half-period, the capacitor 410 is charged through the power switch 211 and the diode 202. Thus, the arrangement has the effect of two booster circuits working together.

The other two phases, i.e., $U_{gen2}$ and $U_{gen3}$, contribute analogously to the charging process of the intermediate circuit 40. Using the booster circuits in the way that has just been described has the effect of regulating the voltage in the intermediate circuit 40 in such a manner that one-half of the voltage drop occurs across the capacitor 410 and one-half across the capacitor 420. As the neutral lead is connected to the midpoint between the capacitors, the potential of the neutral conductor always lies exactly at the midpoint of the voltage across the intermediate circuit.

In addition to providing the required voltage in the intermediate circuit even in the case of low generator-output voltages, the foregoing arrangement has the additional advantage that the voltages of the individual phases will not differ from each other even with an asymmetric load on the phases R, S, T of the grid-adjacent inverter.

As is evident from the foregoing functional description, the circuit according to the invention can be adapted to power grids of different voltages, e.g., 380V, 400V, 440V, 480V or 500V and frequencies of 50 Hz or 60 Hz without making any changes with regard to the technical aspects described herein.

What is claimed is:

1. An electrical circuit for connecting a three-phase generator to a three-phase power grid, wherein the generator has a star-like circuit layout with a center point and is driven at a variable rpm-rate; said electrical circuit having a forward mode where energy flows from the generator either to the power grid or to an energy-storage device and a reverse mode where energy flows either from the power grid or from the energy-storage device to the generator, said electrical circuit comprising a) to support the forward mode: a generator-adjacent circuit stage with generator-adjacent diode rectifiers and generator-adjacent booster circuits, an intermediate circuit stage with two capacitor groups arranged in series and with a midpoint between the capacitor groups, and a grid-adjacent circuit stage with a grid-adjacent inverter;

b) to support the reverse mode: grid-adjacent diode rectifiers and grid-adjacent booster circuits in the grid-adjacent circuit stage, the two capacitor groups in the intermediate circuit stage, and a generator-adjacent inverter in the generator-adjacent circuit stage;

wherein the generator-adjacent and grid-adjacent diode rectifiers, booster circuits and inverters together comprise three generator-adjacent inductive elements, three grid-adjacent inductive elements, six generator-adjacent transistors and six generator-adjacent rectifier diodes, six grid-adjacent transistors and six grid-adjacent rectifier diodes; and wherein the electrical circuit further comprises a neutral conductor connected to said center point and said midpoint.

2. The electrical circuit of claim 1, further comprising a first group of switches between the grid-adjacent inverter and the three phases of the power grid and a second group of switches between the grid-adjacent inverter and the energy-storage device, and wherein at any time only one or the other but not both of the groups of switches can be in a closed state.

3. The electrical circuit of claim 2, wherein if the second group of switches is closed and the electrical circuit is operating in the forward mode, the energy-storage device is being charged through the electrical circuit.

4. The electrical circuit of claim 1, wherein the transistors are switching transistors, and wherein each of the switching transistors is arranged in an anti-parallel pair with one of the diode rectifiers.

5. The electrical circuit of claim 4, wherein the transistors comprise six insulated gate bipolar transistors arranged in three parallel half-bridges in the generator-adjacent circuit stage, and six insulated gate bipolar transistors arranged in three parallel half-bridges in the grid-adjacent circuit stage.

6. The electrical circuit of claim 1, wherein each of the generator-adjacent inductive elements comprises at least one of an internal inductance of the generator and an inductance outside the generator.

7. The electrical circuit of claim 1, wherein the generator comprises a synchronous generator with permanent or externally generated excitation.

8. The electrical circuit of claim 1, wherein the generator comprises an asynchronous generator.

* * * * *

UNITED STATES PATENT AND TRADEMARK OFFICE
CERTIFICATE OF CORRECTION

PATENT NO. : 6,750,633 B2
DATED : June 15, 2004
INVENTOR(S) : Dejan Schreiber

It is certified that error appears in the above-identified patent and that said Letters Patent is hereby corrected as shown below:

<u>Title page,</u>
Item [73], Assignee, please delete "Semikron Elektronik GmbH, Nuremberg (DE)" and substitute -- Semikron Elektronik GmbH, Numberg (DE) --.

Signed and Sealed this

Sixteenth Day of November, 2004

JON W. DUDAS
*Director of the United States Patent and Trademark Office*